Patented Oct. 20, 1942

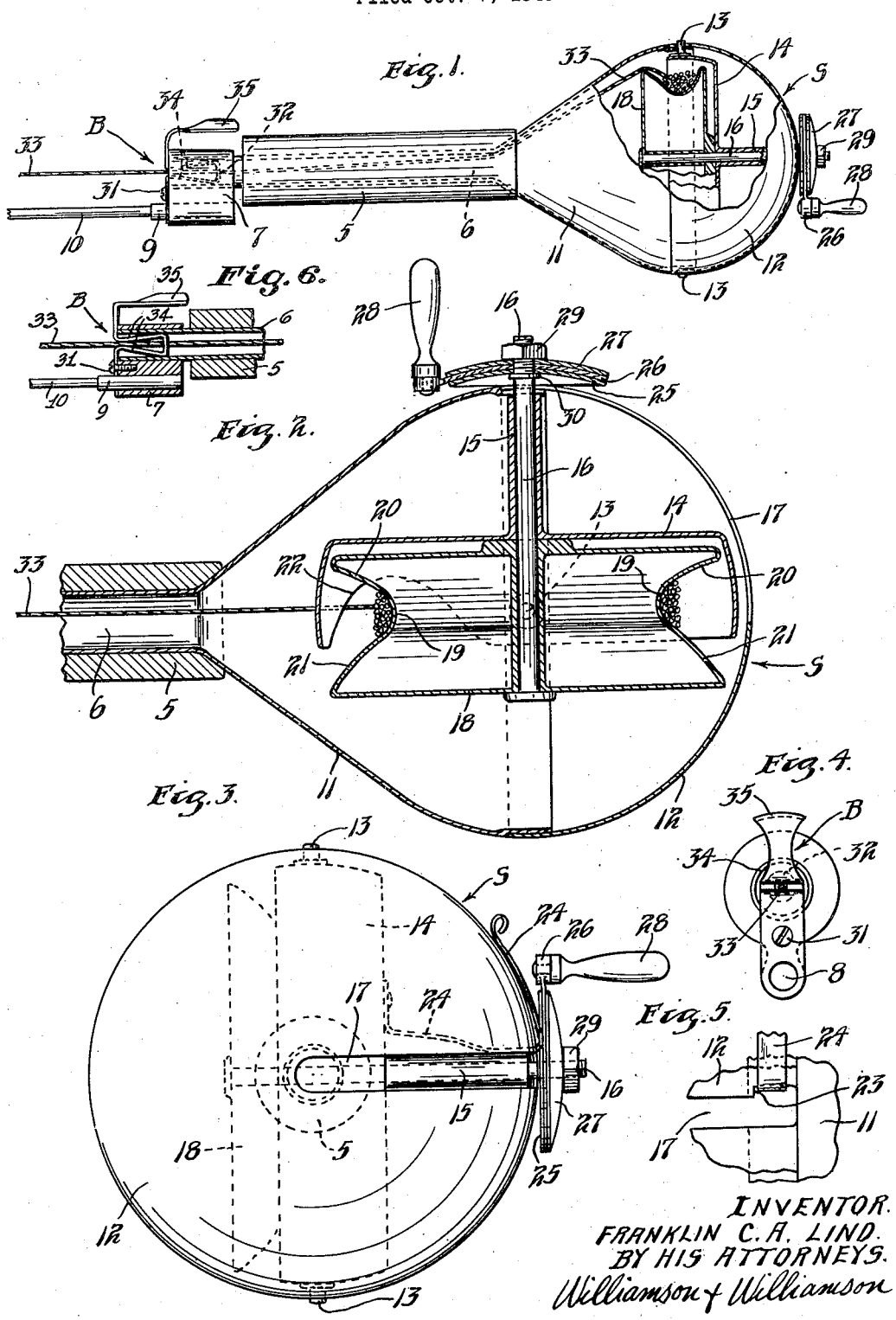

2,299,156

UNITED STATES PATENT OFFICE 2,299,156

FISHING REEL

Franklin C. A. Lind, Randolph, Minn., assignor of one-third to Harry R. E. Lind, Minneapolis, and one-third to John Milton Lind, Red Wing, Minn.

Application October 7, 1940, Serial No. 359,986

5 Claims. (Cl. 43—20)

This invention relates to fishing apparatus and more particularly to means for improving a casting of a fishing line.

Conventional casting apparatus, of course, includes a rod with a reel attached thereto. With the usual type of reel as the line is cast out the reel must be "thumbed" or some other means must be provided for imposing a drag thereon to prevent the reel from overrunning the line winding therefrom and causing backlash. Several types of backlash preventers have been incorporated in reel structures, but, as stated above, they impose a drag on the reel action.

It is an object of my invention to provide a reel structure which will eliminate the possibility of backlash but which at the same time permits the line to run free from the reel with no frictional drag thereon.

Another object of the invention is to provide a reel structure wherein the rotational axis of the spool can be shifted into substantial alignment with the line guides on the rod, and wherein the line can be stripped endwise from the spool while maintaining the spool in a non-rotating condition.

A further object of the invention is to provide means in combination with the spool for confining loops of line as they wind endwise from the spool and properly feeding the line to the guides on the rod so that said line will not kink but will run free and straight.

A further object of the invention is to provide a novel form of brake means in combination with a reel of the type described.

Still another object of the invention is to provide a reel structure which can be set in a casting position as described and can be swung to bring its axis normal to the line of the rod so that the line may be reeled in a convention manner.

A further object of the invention is to provide a combined reel and rod handle wherein the reel is positioned in such manner that it will tend to balance the rod effectively.

Still a further object of the invention is to provide friction clutch means particularly adapted for use with the remainder of the invention.

These and other objects and advantages of the invention will more fully appear from the following description made in connection with the accompanying drawing, wherein like reference characters refer to the same parts throughout the views, and, in which:

Fig. 1 is a side elevation of a rod handle with the inner end of the rod attached thereto and with portions of the reel unit broken away and in section to show interior structure;

Fig. 2 is an enlarged horizontal section through the reel structure showing the spool and its mounting in winding position;

Fig. 3 is a rear elevation of the reel;

Fig. 4 is a front view of the front portion of the handle unit;

Fig. 5 is a fragmentary detail of the releasable catch for holding the reel in winding position; and Fig. 6 is a longitudinal vertical section through the member housing the line brake.

In the drawing there is shown a handle 5 having a longitudinal bore 6 therethrough from end to end. On the lefthand or forward portion of the handle is a member 7 having a rod receiving socket 8 to receive the but end 9 of a suitable rod 10. It will be noted that the fishing rod 10 is in offset relation to the longitudinal handle bore 6.

On the rear of the handle is mounted a substantially ovate shell S comprising a portion 11 which is suitably secured to the rear end of the handle 5. The shell portion 12 has a substantially flush joint connection with the shell portion 11, and said shell sections are detachably secured by means of suitable spring catches 13. In the structure shown the spring catches 13 are in the form of pins which may be depressed to free them from apertures in the overlapping shell sections. The pins forming portions of the spring catches 13 act as pivotal supports for a frame member 14 and said pins are located at top and bottom portions of the shell S so that the frame 14 can be swung on a vertical axis. The frame 14 has a bearing sleeve 15 extending rearwardly therefrom to a point adjacent the inner wall of the rear shell section 12. The bearing sleeve 15 rotatably supports a spool shaft 16 which as best shown in Fig 2, terminates, with a free end within the shell and has its other end extending outwardly through a slot 17 formed in the rear shell section 12. The slot 17 extends in a substantially horizontal plane from adjacent the forward edge of shell 12 to a point at the central rear portion thereof. This permits the frame 14 and spool shaft 16 to be swung from the position shown in Fig. 2 to a position at right angles thereto.

Mounted on the inner or free end of the shaft 16 is a spool 18 which is adapted to rotate with said shaft. Spool 18 has a concave shank portion 19 adapted to receive line windings thereon. The rear portion of the spool shank extends up rather sharply as at 20 to meet the back of the spool, and that portion of the spool shank which extends from the concave portion 19 to the forward end of the spool extends upwardly and forwardly at a much less sharp angle as shown at 21. As seen in Fig. 2 the flange of the frame 14 is cut away as at 22 to permit line on the spool to extend straight forwardly through the tubular handle 6.

At the forward end of the slot 17 in shell section 12 is an upwardly extending notch 23 into which a catch member 24 is adapted to snap when the reel shaft is swung to the full line position shown in Fig. 2. The catch member 24 can be seen in Fig. 3 to extend into the interior of the shell and is suitably secured to the rear portion of the frame 14. This catch locks the reel shaft in line winding position so that the spool and shaft 16 cannot be moved when winding the line upon the spool.

On the outer end of the shaft 16 is a pair of substantially circular plates 25 and 27. Between these plates is a plate 26 having an offset portion to which a crank handle 28 is secured. A nut 29 is threaded on the end of the shaft 16 to frictionally clamp the three plates together, the inner plate 25 being pressed against a collar or shoulder 30. This structure, of course, provides a frictional release in the event excessive resistance to winding results from pull on a large fish or a snag.

Located in the forward portion of the bore 6 and in the block 7 in the front of the handle 5 is a brake B comprising a piece of resilient metal having one end anchored by a bolt 31 on the forward portion of the block 7. The medial portions of the brake member extend into the bore 6 and the rearmost portion thereof is provided with a line aperture and guide 32. The line 33 passes through this aperture and between adjacent portions of the metal strip which form jaws 34. The upper portion of the metal strip extends upwardly then rearwardly above the block 7 to provide a pressing lever 35 so that when the lever is depressed by the thumb of the user, the jaws 34 will frictionally engage the line 33 to retard or stop movement of the line in either direction.

From the foregoing description the function of the device appears to be fairly obvious. One of the principal features is the provision of a reel structure wherein the spool can be shifted. When the line is cast it will coil off the forward end of the reel sliding freely up the surface 21 of the spool. The coils of the line as they leave the spool engage the convergent wall of the shell section 11 so that the line will feed freely into the bore 6 and up through the guides on the fishing rod. Manipulation of the spool 18 on its shaft 16 is extremely simple. It can be swung from the full line to the dotted line position merely by depressing the catch 24 so that it will move out of the notch 23 at the end of the slot 17 in the rear shell portion. When a cast has been made the shaft 16 is then swung to the full line position, whereupon the catch 24 will snap into the notch 23 and the line can immediately be re-wound on the reel.

It will, of course, be understood that various changes may be made in the form, details, arrangement and proportions of the various parts without departing from the scope of my invention.

What is claimed is:

1. Fishing apparatus comprising a tubular handle member constituting a line guide, a generally ovate shell secured to an end of said handle and having an aperture coinciding with the tubular portion of said handle, and a spool rotatably mounted in said shell in a first position with its rotational axis normal to the longitudinal axis of said line guide, and said spool being shiftable to a second position in said shell to bring its rotational axis into substantial alignment with said aperture and tubular line guide.

2. The structure in claim 1 and said shell being disposed in spaced relation to the forward end of said spool in the second position thereof, and said shell having convergent wall portions leading to said line guide.

3. In fishing apparatus and the like, a tubular handle member constituting a line guide, a generally ovate shell secured at its smaller end to an end of said handle and having an aperture coinciding with the tubular portion of said handle, a spool rotatably supported in said shell, and a spool shaft rotatably mounted in said shell and having a free end lying within said shell, the shell having a slotted portion extending in a substantially horizontal plane from a point intermediate the ends of said shell to the rear thereof and the other end of said spool shaft extending outwardly of said shell and having a crank thereon, said spool shaft and spool being swingable through an arc determined by the length of said shell slotted portion, and the two extreme positions of said shaft with respect to said slotted portion being such as to permit positioning of said shaft in two positions at right-angles to each other.

4. Fishing apparatus comprising a shell having a forwardly converging portion, the forward end of which defines an opening, said shell being adapted for connection with a fishing rod, and a spool rotatably mounted in said shell in a first position with its rotational axis substantially normal to the longitudinal axis of said shell, and also positioned with the central diametrical cross sectional portion thereof substantially in alignment with the axis of said shell opening and therebehind, and said spool being shiftable to a second position in said shell to bring its rotational axis into substantial alignment with said opening.

5. The structure in claim 4 and said forwardly converging portion of said shell extending rearwardly to said spool in said second position thereof.

FRANKLIN C. A. LIND.